United States Patent
Therrien (10) Patent No.: US 10,756,829 B1
(45) Date of Patent: Aug. 25, 2020

(54) DETERMINING ERROR VECTOR MAGNITUDE USING CROSS-CORRELATION

(71) Applicant: Teradyne, Inc., North Reading, MA (US)

(72) Inventor: Scott K. Therrien, Billerica, MA (US)

(73) Assignee: Teradyne, Inc., North Reading, MA (US)

(*) Notice: Subject to any disclaimer, the term of this patent is extended or adjusted under 35 U.S.C. 154(b) by 0 days.

(21) Appl. No.: 16/701,964

(22) Filed: Dec. 3, 2019

(51) Int. Cl.
*H04B 17/17* (2015.01)
*G06F 9/52* (2006.01)
*H04B 17/29* (2015.01)

(52) U.S. Cl.
CPC .............. *H04B 17/17* (2015.01); *G06F 9/52* (2013.01); *H04B 17/29* (2015.01)

(58) Field of Classification Search
CPC ............ H04B 17/17; H04B 17/29; G06F 9/52
See application file for complete search history.

(56) References Cited

U.S. PATENT DOCUMENTS

| | | | |
|---|---|---|---|
| 4,965,761 A | 10/1990 | Schlunt | |
| 5,412,325 A | 5/1995 | Meyers | |
| 6,268,735 B1 | 7/2001 | Craig et al. | |
| 6,784,819 B2 | 8/2004 | Chow | |
| 6,979,993 B2 | 12/2005 | Kurosawa | |
| 7,343,558 B2 | 3/2008 | Kadota | |
| 7,719,451 B2 * | 5/2010 | Tamba | G01R 19/2509 341/120 |
| 7,990,418 B2 | 8/2011 | Liu | |
| 8,064,550 B2 | 11/2011 | Chrabieh et al. | |

(Continued)

FOREIGN PATENT DOCUMENTS

| | | |
|---|---|---|
| EP | 1260822 A2 | 11/2002 |
| JP | 4060470 A | 2/1992 |

(Continued)

OTHER PUBLICATIONS

M. Sampietro, L. Fasoli, and G Ferrari, "Spectrum analyzer with noise reduction by cross-correlation technique on two channels", vol. 70, No. 5, May 1999.

(Continued)

*Primary Examiner* — Jaison Joseph
(74) *Attorney, Agent, or Firm* — Burns & Levinson LLP (57) ABSTRACT

An example method determines an error vector magnitude using automatic test equipment (ATE). The method includes demodulating data received at a first receiver to produce first symbol error vectors, where each first symbol error vector represents a difference between a predefined point on a constellation diagram and a first measured point on the constellation diagram generated based on at least part of the data received by the first receiver; demodulating the data received at a second receiver to produce second symbol error vectors, where each second symbol error vector represents a difference between the predefined point on the constellation diagram and a second measured point on the constellation diagram generated based on at least part of the data received by the second receiver; and determining the error vector magnitude for the data based on the first symbol error vectors and the second symbol error vectors.

31 Claims, 5 Drawing Sheets

(56) References Cited

U.S. PATENT DOCUMENTS

| | | |
|---|---|---|
| 8,218,696 B2 | 7/2012 | Rashid et al. |
| 8,255,183 B1 | 8/2012 | Husted et al. |
| 8,680,852 B2 | 3/2014 | Daly et al. |
| 9,442,148 B2 * | 9/2016 | Chow ............... G01R 29/26 |
| 2004/0001017 A1 * | 1/2004 | Chow ............... H03M 1/0836 |
| | | 341/155 |
| 2004/0100244 A1 * | 5/2004 | Kurosawa ............ H04B 17/16 |
| | | 324/76.33 |
| 2005/0137814 A1 | 6/2005 | Kelly et al. |
| 2005/0238094 A1 | 10/2005 | Bessho et al. |
| 2007/0225927 A1 | 9/2007 | Bessho et al. |
| 2008/0036865 A1 * | 2/2008 | Liu ................... H04N 17/00 |
| | | 348/180 |
| 2008/0219386 A1 | 9/2008 | Chrabieh et al. |
| 2009/0082981 A1 | 3/2009 | Muto |
| 2010/0283902 A1 | 11/2010 | Rashid et al. |
| 2010/0327860 A1 | 12/2010 | Daly et al. |
| 2011/0309842 A1 * | 12/2011 | Behzad ............. G01R 31/3025 |
| | | 324/501 |

FOREIGN PATENT DOCUMENTS

| | | |
|---|---|---|
| JP | H07-270464 A | 10/1995 |
| JP | 10-082812 | 3/1998 |
| JP | 2005-184407 A | 7/2005 |
| JP | 2005-308511 A | 11/2005 |
| JP | 2007-295257 A | 11/2007 |
| JP | 04-050783 B1 | 2/2008 |
| JP | 2008-122079 A | 5/2008 |
| JP | 4176479 B2 | 11/2008 |
| TW | 201008141 A | 2/2010 |

OTHER PUBLICATIONS

Alink et al., "A 50MHz-to-1.5GHz Cross-Correlation CMOS Spectrum Analyzer for Cognitive Radio with 89dB SFDR in 1MHz RBW," IEEE (2010), 6 pgs.

* cited by examiner

DETERMINING ERROR VECTOR MAGNITUDE USING CROSS-CORRELATION

TECHNICAL FIELD

This specification describes examples of systems for determining an error vector magnitude using cross-correlation.

BACKGROUND

Test systems are configured to test the operation of electronic devices, such as microprocessors and memory chips, Testing may include sending signals to a device and determining how the device reacted to those signals based on its response. For example, testing may include sending test signals to a device, such as an integrated circuit (IC), and receiving radio frequency (RF) signals back from the device. The RF signals are processed to determine whether the device is performing acceptably. An error vector magnitude (EVM) is a measure of signal quality in the test system.

SUMMARY

An example method determines an error vector magnitude using automatic test equipment (ATE). Operations include receiving data from a device under test (DUT) at a first receiver of the ATE, and demodulating the data received at the first receiver to produce first symbol error vectors, where each first symbol error vector represents a difference between a predefined point on a constellation diagram and a first measured point on the constellation diagram generated based on at least part of the data received by the first receiver. The operations also include receiving the data from the DUT at a second receiver of the ATE, where the second receiver is different from the first receiver, and demodulating the data received at the second receiver to produce second symbol error vectors, where each second symbol error vector represents a difference between the predefined point on the constellation diagram and a second measured point on the constellation diagram generated based on at least part of the data received by the second receiver. The error vector magnitude is determined for the data based on the first symbol error vectors and the second symbol error vectors.

The method may be performed using ATE that includes the first receiver, the second receiver, and one or more processing devices to perform the example operations included in the method. The example operations included in method may be implemented using instructions stored on one or more non-transitory machine-readable storage media that are executable by one or more processing devices.

The method, ATE, or instructions stored on machine-readable storage media may include one or more of the following features, either alone or in combination.

The received data may include a modulated signal. Determining the error vector magnitude for the data may include cross-correlating the first symbol error vectors and the second symbol error vectors. The cross-correlating removes at least some error contributions to the data produced by at least one of the first receiver or the second receiver. The at least some error contributions may include uncorrelated noise. At least part of the uncorrelated noise may result from one or more components of the ATE that are not common to both the first receiver and the second receiver. Cross-correlating the first symbol error vectors and the second symbol error vectors may include, for each first symbol error vector and second symbol error vector pair, multiplying the first symbol error vector by a conjugate vector of the second symbol error vector.

Determining the error vector magnitude for the data may include performing operations comprising: (a) for a point on the constellation diagram that corresponds to a symbol, cross-correlating a first symbol error vector among the first symbol error vectors and a second error vector among the second symbol error vectors to produce a result; (b) adding a result of the cross-correlating to an aggregate; (c) repeating operations (a) and (b) for multiple bursts of the data thereby increasing the aggregate following each of the multiple bursts; (d) dividing the aggregate by a number of the multiple bursts to produce an average for the point on the constellation diagram; (e) determining a square root of the average to obtain a component error vector magnitude for the point on the constellation diagram; and (f) determining a root-mean-square of the component error vector magnitude and of other component error vector magnitudes for other points on the constellation diagram to obtain the error vector magnitude for the data. The first symbol error vector may include a symbol error vector generated for the point based on a first burst of the data, and the second symbol error vector may include a symbol error vector generated for the point based on the first burst of the data.

The one or more processing devices may include a digital signal processor. Different cross-correlation operations may be performed contemporaneously on different asynchronous threads executing on the digital signal processor. The received data may include one or more complete or partial data packets. The one or more complete or partial data packets may be produced by the DUT simultaneously with triggering operation of the first receiver and the second receiver.

The received data may include a digital modulated signal having a plurality of carrier signals. An error vector magnitude may be determined for each one of the plurality of carrier signals. The data received at the first receiver and at the second receiver may be from a sub-carrier of an orthogonal frequency-division multiplexing (OFDM)-modulated data stream. The error vector magnitude may be determined for each sub-carrier of the OFDM-modulated data stream.

The data from the DUT may be received at the first receiver and at the second receiver via a splitter that receives the data from a test channel and that sends the data to each of the first receiver and the second receiver. The error vector magnitude for the data may be at least partially based on uncorrelated noise from at least one of components or signals of the ATE. At least one of the components or signals may not be common to the first receiver and the second receiver.

The predefined point on the constellation diagram may include an ideal point on the constellation diagram. The predefined point on the constellation diagram may include an estimated point on the constellation diagram.

Any two or more of the features described in this specification, including in this summary section, may be combined to form implementations not specifically described in this specification.

At least part of the test systems and processes described in this specification may be configured or controlled by executing, on one or more processing devices, instructions that are stored on one or more non-transitory machine-readable storage media. Examples of non-transitory machine-readable storage media include read-only memory, an optical disk drive, memory disk drive, and random access memory. At least part of the test systems and processes described in this specification may be configured or controlled using a computing system comprised of one or more processing devices and memory storing instructions that are executable by the one or more processing devices to perform various control operations.

The details of one or more implementations are set forth in the accompanying drawings and the following description. Other features and advantages will be apparent from the description and drawings, and from the claims.

DESCRIPTION OF THE DRAWINGS

Like reference numerals in different figures indicate like elements.

DETAILED DESCRIPTION

Described herein are example implementations of a test system, such as automatic test equipment (ATE), that is configured to determine error vector magnitude measurements using cross-correlation (Xcorr). In this regard, among the tests performed by the ATE on a device under test (DUT), such as an integrated circuit (IC) or other chip-level component, are tests of the DUTs signal characteristics. In an implementation, the ATE includes multiple channels—one each for testing a corresponding DUT. Individual channels of the ATE, however, cannot be used to make accurate noise measurements on DUTs that have a noise level lower than the noise floor of the channel. Noise includes any unwanted irregularities, impairments, signals, or other interference on a channel. Each channel includes noise from various sources, such as power supplies, clocks, and other circuitry connected to the channel. If a signal, such as a radio frequency (RF) signal, received from the DUT on a channel has a noise level that is less than the noise floor of the channel, the signal from the DUT cannot be measured accurately and, therefore, cannot be used for testing or other purposes. Accordingly, the test systems described herein are configured to receive the same signal on two different channels of the ATE and to cross-correlate those signals.

Regarding noise levels on the two channels, the noise includes a combination of correlated noise and uncorrelated noise. Correlated noise includes, for example, noise that is common to both channels, such as noise produced by a common power supply, noise produced by a common clock, and so forth. Uncorrelated noise includes, for example, random noise including, but not limited to, noise that is not common to both channels. In some examples, uncorrelated noise includes noise produced from sources that are specific to individual channels, such as amplifiers, synthesizer clocks, and so forth. Generally, correlated noise and uncorrelated noise cannot be distinguished from each other or from the noise contribution of the DUT signal on a single channel. However, performing cross-correlation of signals from two channels over a number of data bursts reduces the level of uncorrelated noise, leaving only correlated noise for the two channels. The more data bursts that are used, the greater the reduction in uncorrelated noise on the channel. By reducing the noise level on the channel, it is possible to perform testing using channels that, individually and without cross-correlation, would not be able to distinguish noise that originates from the DUT from noise on the channel.

Error vector magnitude (EVM) is a measure of how accurately a DUT is capable of transmitting symbols that align to a reference constellation and, thus, is a figure of merit for representing the modulation quality of the DUT. EVM measurements are indicative of the quality of a signal. In the techniques described herein, the EVM measurements are based on cross-correlation of signals from two different ATE channels and, consequently, an EVM can be determined for error contributions that are below the noise floor of the individual ATE channels.

In an example implementation, the ATE includes a first receiver to receive data from a DUT and a second receiver to receive the same data from the DUT. For example, the data may be transmitted using an RF signal. For example, The DUT transmits an RF signal. That signal is a modulated signal that contains a complete or partial modulated data packet. An RF signal splitter may precede the two channels and provide the same signal to each channel. One or more processing devices, such as a digital signal processor (DSP), may be configured to execute instructions to perform operations that include demodulating the data received at the first receiver to produce first symbol error vectors, where each first symbol error vector represents a difference between a predefined point, such as an ideal point, on a constellation diagram and a first measured point on the constellation diagram generated based on at least part of the data received by the first receiver; and demodulating the data received at the second receiver to produce second symbol error vectors, where each second symbol error vector represents a difference between the predefined point, such as an ideal point, on the constellation diagram and a second measured point on the constellation diagram generated based on at least part of the data received by the second receiver. The one or more processing devices determine the EVM for the data based on the first symbol error vectors and the second symbol error vectors by cross-correlating the first symbol error vectors and the second symbol error vectors. The cross-correlating removes at least some error contributions, such as uncorrelated noise, to the data received by at least one of the first receiver or the second receiver.

Figure 1:
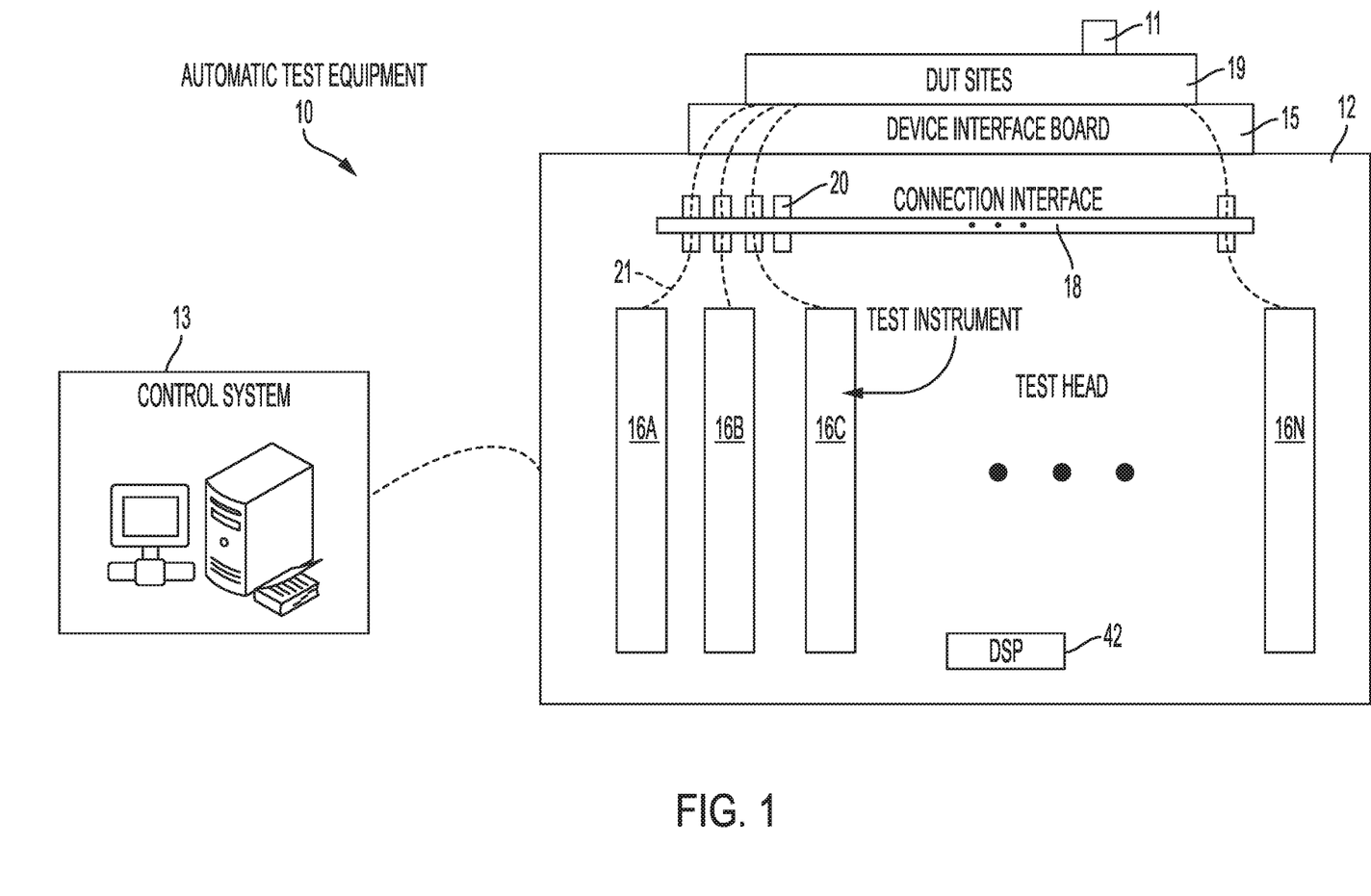
FIG. 1 is a block diagram of components of an example test system on which the techniques described herein may be implemented.

FIG. 1 shows components of example ATE 10 that may be used to implement the techniques described herein. In FIG. 1, the dashed lines represent, conceptually, potential signal paths between components of the system.

ATE 10 includes a test head 12 and a control system 13. The control system may include a computing system comprised of one or more microprocessors or other appropriate processing devices as described herein. Device interface board (DIB) 15 includes a printed circuit board (PCB) that is connected to test head 12 and that includes mechanical and electrical interfaces to one or more DUTs, such as DUT 11, that are being tested or are to be tested by the ATE. Power, including voltage, may be run via one or more conduits in the DIB to DUTs connected to the DIB.

In the example of FIG. 1, DIB 15 connects, electrically and mechanically, to test head 12. The DIB includes sites 19, which may include pins, conductive traces, or other points of electrical and mechanical connection to which the DUTs may connect. Test signals and response signals, such as RF signals, and other signals pass via test channels over the sites between the DUTs and test instruments. DIB 15 may also include, among other things, connectors, conductive traces and circuitry for routing signals between the test instruments, DUTs connected to sites 19, and other circuitry.

Control system 13 communicates with components included in the test head to control testing. For example, control system 13 may download test program sets to test instruments 16A to 16N in the test head. The test instruments include hardware devices that may include one or more processing devices and other circuitry. Test instruments 16A to 16N may run the test program sets to test DUTs in communication with the test instruments. Control system 13 may also send, to test instruments in the test head, instructions, test data, and/or other information that are usable by the test instruments to perform appropriate tests on DUTs interfaced to the DIB. In some implementations, this information may be sent via a computer or other type of network or via a direct electrical path. In some implementations, this information may be sent via a local area network (LAN) or a wide area network (WAN).

In an example, a test program generates a test flow to provide to the DUT. The test flow is written to output test signals to elicit a response from the DDT, for example. As noted, the test signals and the response from the DUT may include RF signals.

In the example of FIG. 1, ATE 10 includes multiple test instruments 16A to 16N, each of which may be configured, as appropriate, to perform one or more of testing and/or other functions. Although only four test instruments are depicted, the system may include any appropriate number of test instruments, including those residing outside of test head 12. In some implementations, each test instrument may be configured to output digital or RF signals to test a DUT based, e.g., on data provided by the control system, and to receive digital or RF response signals from the DUT. Different test instruments may be configured to perform different types of tests and/or be configured to test different DUTs. For example, the test instruments may include an RF test instrument 16B to send RF test signals to a DUT and to receive RF response signals from the DUT. The received signals may include RF response signals that are based on the test signals and/or signals that originate from the DUT that are not prompted by (e.g., are not in response to) test signals. In some implementations, there may be electrical conductors, such as coaxial wires, between the DUT, the DIB, and the test instrument interfaces over which test and response signals are sent.

Signals, including RF signals, may be sent to, and received from, the DUT over multiple test channels or other electrically conductive media. In some examples, a test channel may include the physical transmission medium or media over which signals are sent from the test instrument to a DUT and over which signals are received from the DUT. Physical transmission media may include, but are not limited to, electrical conductors alone or in combination with optical conductors, wireless transmission media, or both optical conductors and wireless transmission media. In some examples, a test channel may include a range of frequencies over which signals are transmitted over one or more physical transmission media. A test channel may include and/or electrically connect to a conductive trace on the DIB. A test channel may also include hardware on the test instrument for receiving and digitizing signals.

In some examples, ATE 10 includes a connection interface 18 that connects test instrument test channels 21 to DIB 15. Connection interface 18 may include connectors 20 or other devices for routing signals between the test instruments and DIB 15. For example, the connection interface may include one or more circuit boards or other substrates on which such connectors are mounted. Conductors that are included in the test channels may be routed through the connection interface and the DIB.

Figure 2:
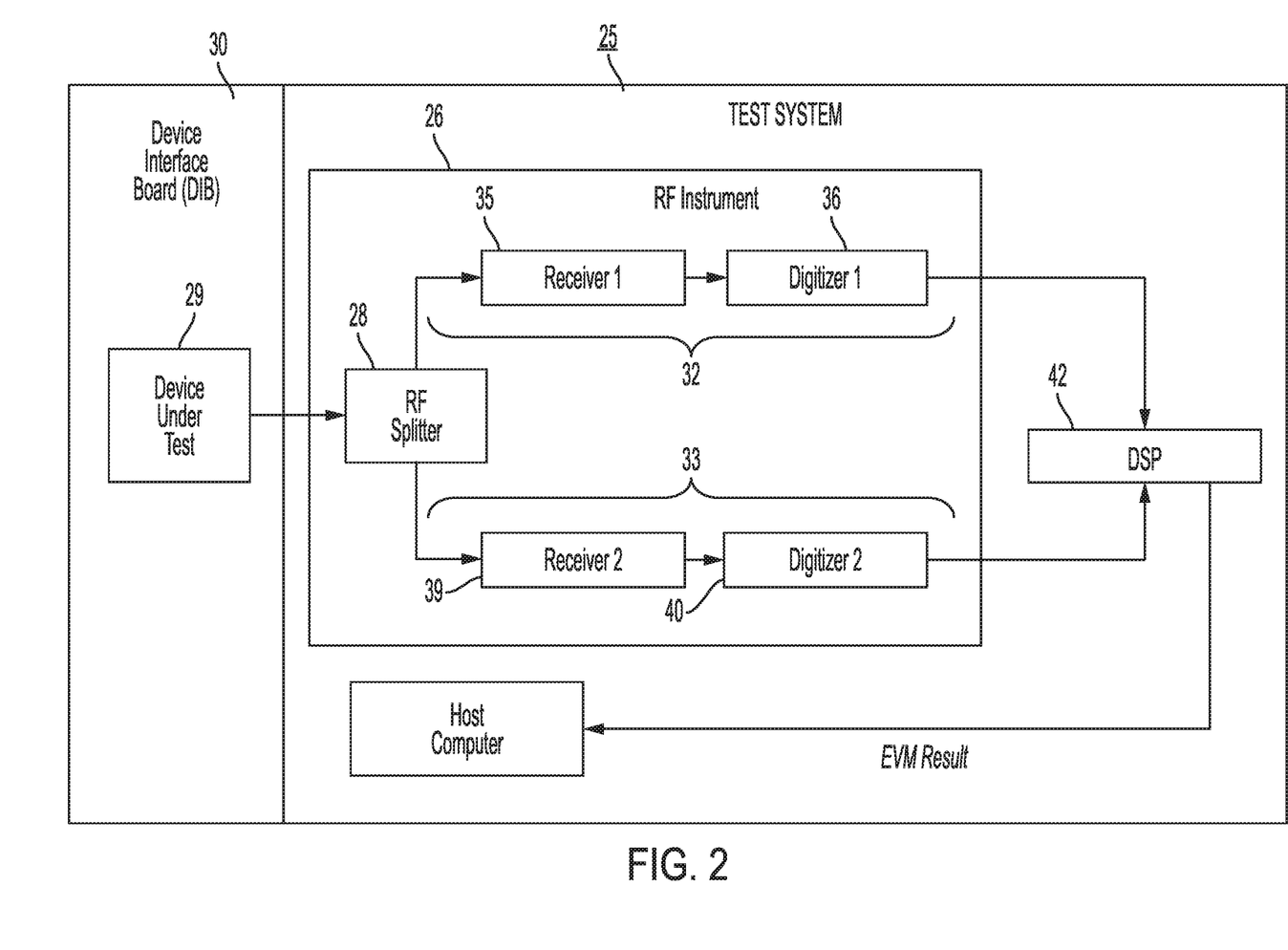
FIG. 2 is a block diagram of components of an example test instrument.

FIG. 2 is a block diagram showing an example implementation of components of a test system 25, such as ATE 10, that focus on an RF test instrument 26. RF test instrument 26 may be an implementation of RF test instrument 16B. In this example, RF test instrument 26 includes an RF splitter 28 configured to receive, over a channel of the test system, RF signals from a DUT 29 on DIB 30 and to output two identical RF signals to different channels 32 and 33 included on RF test instrument 26. Channel 32 includes a receiver 35 and a digitizer 36, and channel 33 includes a receiver 39 and a digitizer 40. In this example, a receiver may be part of a channel and includes any hardware capable of receiving an RF signal. Each receiver 35 and 39 receives the same RF signal and outputs that RF signal to a respective digitizer 36 and 40. Each digitizer 36 and 40 generates and outputs digital data that is representative of the RF signal, including both correlated and uncorrelated noise introduced by the channel, including noise introduced by each receiver.

In this example, test system 25 includes a DSP 42, which is also shown in FIG. 1. DSP 42 is multi-threaded in this example. DSP 42 receives the data from each channel and demodulates the digital data. Demodulating the data includes calculating the ideal and actual points of the constellation from the data, then producing a symbol error vector that represents a difference between an ideal point on a constellation diagram and an actual measured point on the constellation diagram. An example constellation diagram includes a graphical representations of symbols transmitted using RF signals. In this regard, digitally modulated signals encode information using a sinusoidal carrier signal by mixing the sinusoidal carrier wave with a data signal. The data signal modifies the amplitude, the phase angle, or both the amplitude and the phase angle of the carrier signal to produce a modulated signal. The modulated signal includes a combination of amplitude and phase values. This combination of amplitude and phase values may represent symbols that represent one or more bits of data. These symbols correspond to points on the constellation diagram. The location of each point on the constellation diagram is based on the amplitude and the phase angle associated with its corresponding symbol. For example, as shown in example constellation diagram 45 of FIG. 3, points representing four-bit symbols are arranged on a two-dimensional graph representing the inphase (I) and quadrature (Q) complex plane. In this example, each point represents the ideal location of a symbol within that plane. However, in other examples, each point may represent an estimated location of an ideal point in the plane.

Figure 3:
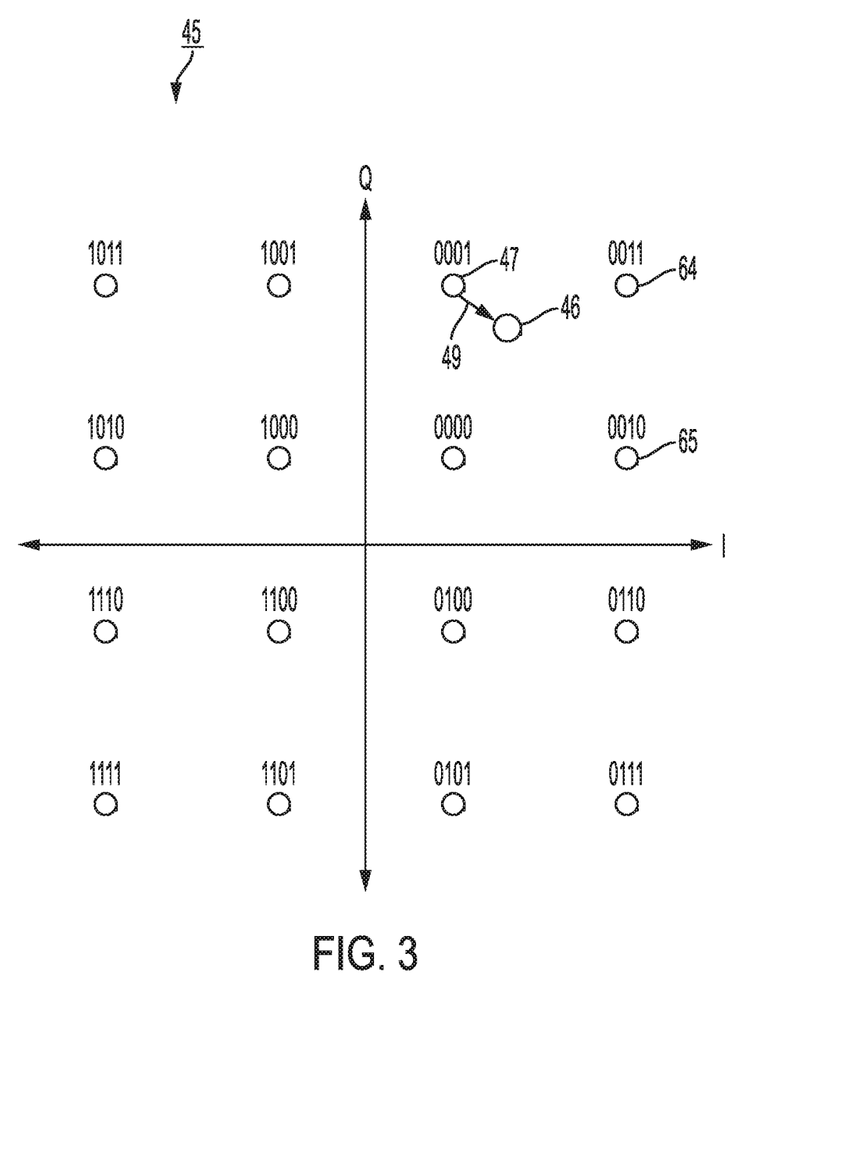
FIG. 3 is an example of a constellation diagram.

When DSP 42 demodulates received data, the DSP identifies a location of a symbol, such as "0001", represented by the data on the constellation diagram. In some cases, the location of a symbol represented by the data does not coincide with the location of that symbol on the ideal reference constellation diagram. For example, a symbol (0001) represented by the data may be located at point 46 on the constellation diagram. The difference between the ideal point 47 and the measured point 46 constitutes an error, which may be due to noise in the RF signal upon which the data is based. This error may be determined relative to the closest predetermined point in the constellation diagram. An error vector 49 represents this difference in location between the predetermined and measured points. Accordingly, using the constellation diagram, the error vector represents the error in the measured signal.

As noted above, sources of error in the measured signal include correlated and uncorrelated noise. To reduce error produced by uncorrelated noise, the error vectors from the same signal for the same symbol may be cross-correlated. In an example, cross-correlating error vectors includes, for each first symbol error vector and second symbol error vector pair, multiplying the first symbol error vector by a conjugate vector of a the second symbol error vector. The cross-correlation reduces the effects of uncorrelated noise on the EVM. As explained below, error vectors for multiple—for example, 10, 100, or 1000—data bursts representing the same symbol may be processed in this manner. Generally, the more error vectors that are cross-correlated, the greater the reduction in error. However, in some examples, successive reductions in noise require an exponentially greater number of error vectors. In an example, to achieve a 5 decibel noise reduction, 10 bursts of data may be required. To then achieve an additional 5 decibel noise reduction, 100 bursts of data may be required. To then achieve an addition 5 decibel noise reduction, 1000 bursts of data may be required, and so forth. In other examples, this may not be the case.

The cross-correlation separates correlated complex vectors from uncorrelated complex vectors. In this regard, cross-correlation of two signals provides an estimate of the correlated component of two signals. Cross-correlation of two identical—that is, correlated—signals yields the magnitude squared of that signal. Cross correlation of two uncorrelated signal yields another uncorrelated (seemingly random) signal. Averaging cross-correlated results from composite signals, for example, signals that contain correlated plus uncorrelated summed components, will result in an estimate of the magnitude of the correlated component of that signal, since averaging of the uncorrelated (random) component of the signal will trend to zero. Cross-correlation performed on complex signals returns a magnitude only; phase information is lost.

The following illustrates EVM cross-correlation mathematical principles.

$e_1$: symbol error vector from signal capture by receiver channel 1 represented in complex plane $e_2$: symbol error vector from signal capture by receiver channel 2 represented in complex plane $e_{DUT}$: symbol error vector from DUT, represented in complex plane $e_{rcv1}$: symbol error vector from receiver channel 1 represented in complex plane $e_{rcv2}$: symbol error vector from receiver channel 2 represented in complex plane All error vectors e are zero-mean, uncorrelated random constructs. The variance of each error vector magnitude is denoted as $\sigma_{DUT}^2$, $\sigma_{rcv1}^2$ and $\sigma_{rcv}^2$. "Uncorrelatedness" implies any cross combinations of real and imaginary parts among these error vectors will be a zero-mean, where "Re" refers to a real component and "Im" refers to an imaginary component of each vector in the cross-correlations, E, below:

$$E(\text{Re}(e_{DUT}) \cdot \text{Re}(e_{rcv1})) = E(\text{Im}(e_{DUT}) \cdot \text{Im}(e_{rcv1})) =$$
$$E(\text{Re}(e_{DUT}) \cdot \text{Im}(e_{rcv1})) = E(\text{Im}(e_{DUT}) \cdot \text{Re}(e_{rcv1})) = 0$$

$$E(\text{Re}(e_{DUT}) \cdot \text{Re}(e_{rcv2})) = E(\text{Im}(e_{DUT}) \cdot \text{Im}(e_{rcv2})) =$$
$$E(\text{Re}(e_{DUT}) \cdot \text{Im}(e_{rcv2})) = E(\text{Im}(e_{DUT}) \cdot \text{Re}(e_{rcv2})) = 0$$

$$E(\text{Re}(e_{rcv1}) \cdot \text{Re}(e_{rcv2})) = E(\text{Im}(e_{rcv1}) \cdot \text{Im}(e_{rcv2})) =$$
$$E(\text{Re}(e_{rcv1}) \cdot \text{Im}(e_{rcv2})) = E(\text{Im}(e_{rcv1}) \cdot \text{Re}(e_{rcv2})) = 0$$

As a corollary, any cross combinations of conjugate projections among these error vectors will also be a zero-vector-mean:

$$E(e_{DUT} \cdot e_{rcv1}) = E(e_{DUT}^* \cdot e_{rcv1}^*) = E(e_{DUT} \cdot e_{rcv1}^*) = E(e_{DUT}^* \cdot e_{rcv1}) = 0$$

$$E(e_{DUT} \cdot e_{rcv2}) = E(e_{DUT}^* \cdot e_{rcv2}^*) = E(e_{DUT} \cdot e_{rcv2}^*) = E(e_{DUT}^* \cdot e_{rcv2}) = 0$$

$$E(e_{rcv1} \cdot e_{rcv2}) = E(e_{rcv1}^* \cdot e_{rcv2}^*) = E(e_{rcv1} \cdot e_{rcv2}^*) = E(e_{rcv1}^* \cdot e_{rcv2}) = 0$$

The cross-Correlation operation between the error vectors from both captures is as follows:

$$E(e_1 \cdot e_2^*) = E((e_{DUT} + e_{rcv1}) \cdot (e_{DUT} + e_{rcv2})^*)$$
$$= E(e_{DUT} \cdot e_{DUT}^* + e_{rcv1} \cdot e_{DUT}^* + e_{DUT} \cdot e_{rcv2}^* + e_{rcv1} \cdot e_{rcv2}^*)$$
$$= E(e_{DUT} \cdot e_{DUT}^*) + E(e_{rcv1} \cdot e_{DUT}^*) + E(e_{DUT} \cdot e_{rcv2}^*) +$$
$$E(e_{rcv1} \cdot e_{rcv2}^*)$$
$$= E(e_{DUT} \cdot e_{DUT}^*) = \sigma_{DUT}^2$$

Thus, the cross-correlation operation will asymptotically eliminate uncorrelated error contributions, including uncorrelated noise from each receiver channel.

In the systems described herein, the output of a demodulation process is a constellation point or points which, when subtracted from the ideal constellation point or points, yields complex values. If two receivers are used to measure a common DUT signal, then the uncorrelated noise error can be removed from the DUT error measurement using cross correlation estimation.

Figure 4:
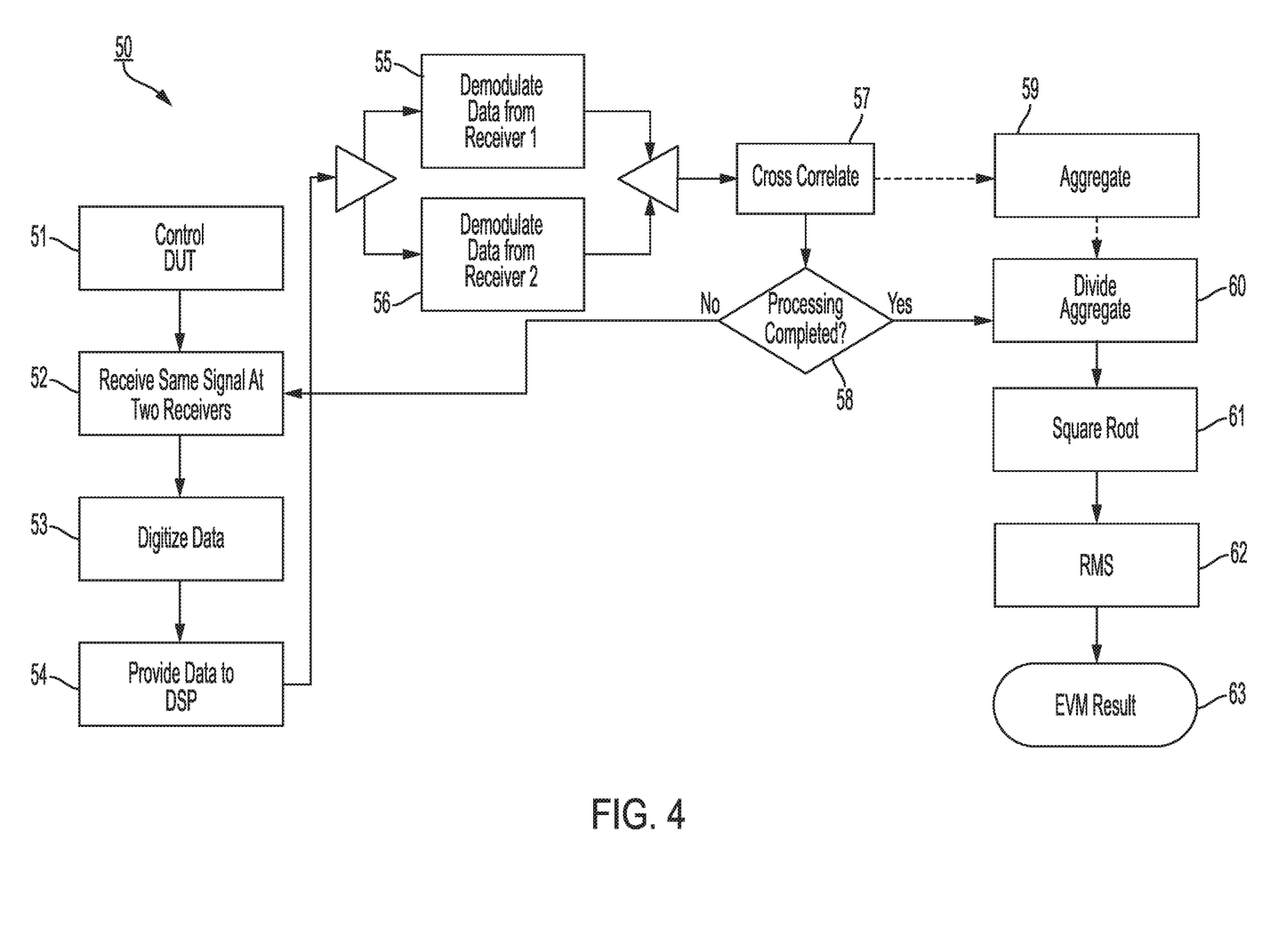
FIG. 4 is a flowchart containing example operations included in an example process for determining an error vector magnitude by cross-correlating error vectors from multiple channels.

FIG. 4 is a flowchart showing an example process 50 for determining an EVM based on signals received from a DUT over multiple ATE channels. Process 50 includes configuring and controlling (51) a DUT to provide modulated RF signals to the ATE. The signals may be sent over a channel of the ATE and may be responsive to a stimulus or test signal sent to the DUT. In this example, two receivers are configured to receive (52) the same signal from the DUT. As explained previously, the signal from the DUT may be replicated using an RF splitter that is located prior to the receivers in the channel. The data for the RF signal is digitized (53) and the resulting digital data is provided to and received by (54) by a DSP. The data represented by the RF signal may include one or more complete or partial data packets. The one or more complete or partial data packets may be produced by the DUT simultaneously with triggering operation of the first receiver and the second receiver. The DSP is configured to perform operations 55 to 63 to produce an EVM result for the signals.

The operations include demodulating (55) the data received at the first receiver to produce first symbol error vectors. As noted, each first symbol error vector represents a difference between a predefined point on a constellation diagram and a first measured point on the constellation diagram generated based on at least part of the data received by the first receiver. The operations also include demodulating (56) the data received at the second receiver to produce second symbol error vectors. As noted, each second symbol error vector represents a difference between the predefined point on the constellation diagram and a second measured point on the constellation diagram generated based on at least part of the data received by the second receiver. The data received by the first receiver and the second receiver is the same data representing the same symbol or symbols on the constellation diagram. The data includes both correlated noise and uncorrelated noise. Cross-correlation is performed in order to reduce or to eliminate the uncorrelated noise component from the EVM result.

Operation 57 includes cross-correlating a first symbol error vector generated based on the data from the first receiver and a second symbol error vector generated based on the data from the first receiver. In this regard, the first symbol error vector comprises a symbol error vector generated for the point based on a first burst of the data, and the second symbol error vector comprises a symbol error vector generated for the point based on the first burst of the data. The cross-correlation is for a point on a constellation diagram since the symbol error vectors are relative to that point. The result of the cross correlation is added (59) to an aggregate stored in computer memory. The aggregate represents the sum of cross correlation values for multiple data bursts representing the same symbol. For example, as part of process 50, the DUT may output, in series, multiple data bursts, each representing the same symbol or symbols. Each data burst may be processed according to operations 52 to 59 and the cross-correlation result therefor added to the aggregate stored in computer memory.

If all data bursts for the same symbol or symbols have not been processed (58), the flow returns to operation 52. There, data representing the next burst is received by the first receiver and the second receiver as described previously. In some examples, operations 52 to 59 may be repeated tens, hundreds, thousands, or more times. Each time operations 52 to 59 are repeated, the aggregate increases in value. As noted, the more error vectors that are cross-correlated and processed as described herein, the more uncorrelated noise may be removed from the EVM result.

After all data bursts for the same symbol or symbols have been processed (58), the flow proceeds to operation 60. Operation 60 divides the aggregate by a number of the multiple bursts to produce an average symbol error. For example, if the number of bursts in a series representing the same symbol is 100, then the aggregate is divided by 100 to produce the average. Operation 61 determines the square root of the average symbol error. The square root of the average constitutes the average estimated EVM for the symbol. To obtain the EVM for the system, the estimated EVM for each symbol is taken into account.

More specifically, to obtain the EVM for the system, operation 62 determines a root-mean-square (RMS) of a component error vector magnitude and of other component error vector magnitudes for other symbols on the constellation diagram. In other words, operation 62 determines a root-mean square of the average estimated EVM for a symbol, such as point 47 in constellation diagram 45, and of the average estimated EVMs for all other symbols or a set of other symbols, such as points 64, 65, and so forth. The EVM result is then output (63). For example, the EVM result may be displayed on a monitor of a computing system such as the control system of FIG. 1. In an example, the EVM result is compared against a specified limit by ATE software in order to determine whether a DUT passes or fails a test.

In some implementations, the data received by the first and second receivers include a modulated signal having a plurality of carrier signals. For example, the data received at the first receiver and at the second receiver may be from a sub-carrier of an orthogonal frequency-division multiplexing (OFDM)-modulated data stream. In these implementations, an error vector magnitude is determined for each one of the plurality of sub-carrier signals. For example, the error vector magnitude may be determined for each sub-carrier of the OFDM-modulated data stream.

Figure 5:
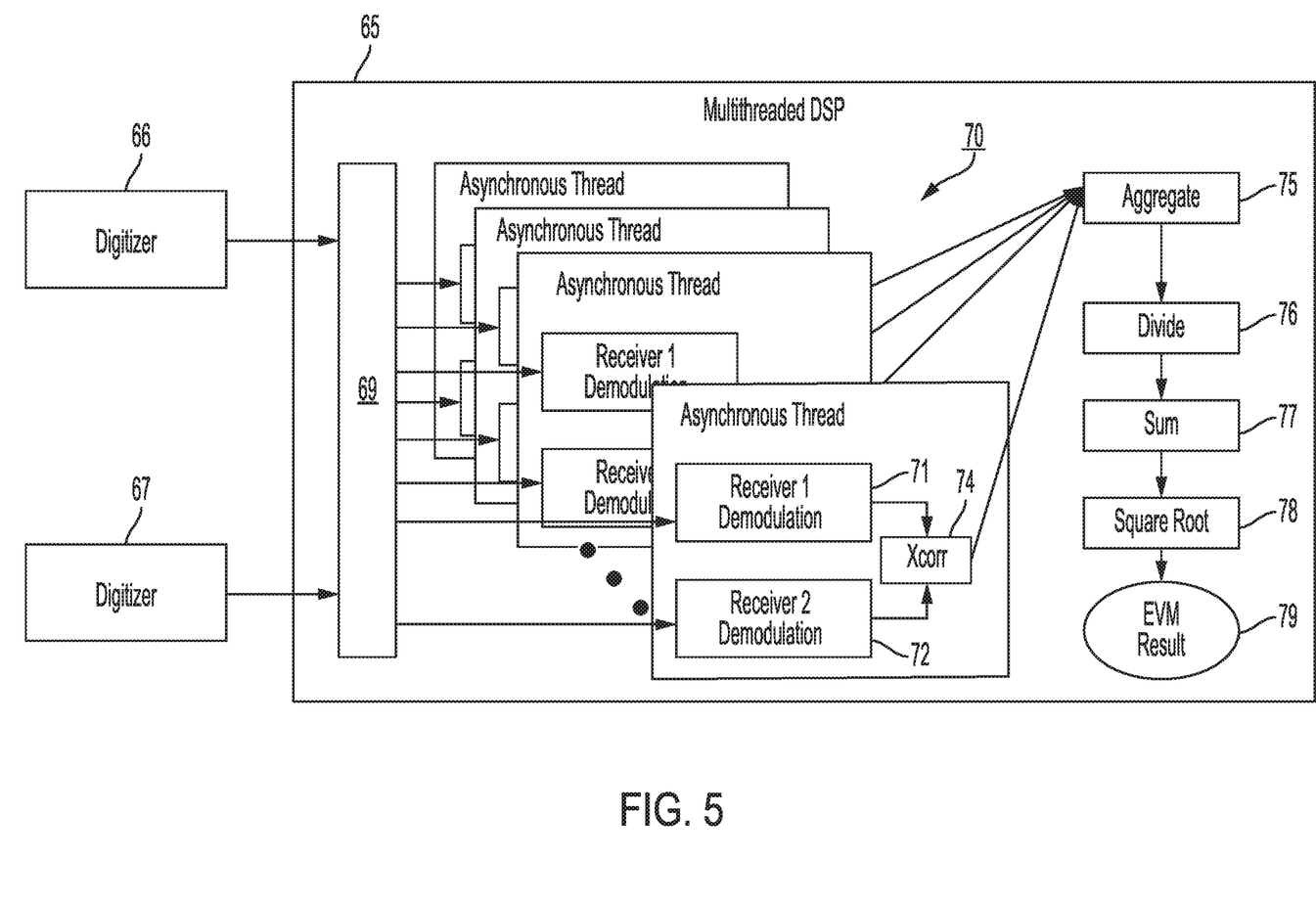
FIG. 5 is a block diagram of components of an example multi-threaded digital signal processor for implementing the techniques described herein.

In some implementations, DSP 42 is configured to execute different threads contemporaneously, for example, simultaneously. In an example, different cross-correlation operations may be performed contemporaneously on different asynchronous threads executing on the DSP. This is shown conceptually in FIG. 5. There, digital data is received at DSP 65, which may be the same as the DSP of FIG. 2, from digitizers 66 and 67, which may be the same as the digitizers of FIG. 2. The data is distributed via module 69 to multiple threads 70 executing on the DSP. In some implementations, the number of threads executing on DSP 65 may equal the number of the multiple bursts. That is, data from each burst may be processed by a separate thread. In some implementations this may not be the case. For example, the number of data bursts may be a multiple of the number of threads. At least some of the processing performed by two or more of the threads may be contemporaneous. As shown, each thread includes a demodulator 71 and 72 for a corresponding receiver and a cross-correlation module 74. The result of each cross correlation is added and stored to produce an aggregate (75). The aggregate is divided by the number of bursts to produce an average (76). In this example, the average for each constellation point is summed (77) and a square root of the resulting sum is determined (78) to obtain the EVM (79).

In some implementations, cross-correlation may be performed on two receiver channels that reside on a common channel card or with two receiver channels that reside on distinct (e.g., separate) channel cards. Depending on tester architecture, the latter (receivers on distinct channel cards) may have less correlated noise than the former. For example, referring to FIG. 2, channel 32 may be on one channel card and channel 33 may be on a different, separate channel card. Since the channel cards in this example are implemented using different and/or separate hardware, the amount of uncorrelated noise may increase relative to the same channels implemented on the same channel card. As such, the techniques described herein may be used to provide additional noise reductions relative to corresponding noise reductions produced using two channels on the same channel card.

The techniques described herein may be implemented on chip-level devices, as noted above. The techniques described herein may also be implemented when performing system-level test, that is, testing on the system level.

All or part of the test systems and processes described in this specification and their various modifications may be configured or controlled at least in part by one or more computers such as control system 13 using one or more computer programs tangibly embodied in one or more information carriers, such as in one or more non-transitory machine-readable storage media. A computer program can be written in any form of programming language, including compiled or interpreted languages, and it can be deployed in any form, including as a stand-alone program or as a module, part, subroutine, or other unit suitable for use in a computing environment. A computer program can be deployed to be executed on one computer or on multiple computers at one site or distributed across multiple sites and interconnected by a network.

Actions associated with configuring or controlling the test system and processes described herein can be performed by one or more programmable processors executing one or more computer programs to control or to perform all or some of the operations described herein. All or part of the test systems and processes can be configured or controlled by special purpose logic circuitry, such as, an FPGA (field programmable gate array) and/or an ASIC (application-specific integrated circuit) or embedded microprocessor(s) localized to the instrument hardware.

Processors suitable for the execution of a computer program include, by way of example, both general and special purpose microprocessors, and any one or more processors of any kind of digital computer. Generally, a processor will receive instructions and data from a read-only storage area or a random access storage area or both. Elements of a computer include one or more processors for executing instructions and one or more storage area devices for storing instructions and data. Generally, a computer will also include, or be operatively coupled to receive data from, or transfer data to, or both, one or more machine-readable storage media, such as mass storage devices for storing data, such as magnetic, magneto-optical disks, or optical disks. Non-transitory machine-readable storage media suitable for embodying computer program instructions and data include all forms of non-volatile storage area, including by way of example, semiconductor storage area devices, such as EPROM (erasable programmable read-only memory), EEPROM (electrically erasable programmable read-only memory), and flash storage area devices; magnetic disks, such as internal hard disks or removable disks; magneto-optical disks; and CD-ROM (compact disc read-only memory) and DVD-ROM (digital versatile disc read-only memory).

Elements of different implementations described may be combined to form other implementations not specifically set forth previously. Elements may be left out of the systems described previously without adversely affecting their operation or the operation of the system in general. Furthermore, various separate elements may be combined into one or more individual elements to perform the functions described in this specification.

Other implementations not specifically described in this specification are also within the scope of the following claims.

What is claimed is:

1. A method of determining an error vector magnitude performed using automatic test equipment (ATE), the method comprising:
   receiving data from a device under test (DUT) at a first receiver of the ATE;
   demodulating the data received at the first receiver to produce first symbol error vectors, each first symbol error vector representing a difference between a predefined point on a constellation diagram and a first measured point on the constellation diagram generated based on at least part of the data received by the first receiver;
   receiving the data from the DUT at a second receiver of the ATE, the second receiver being different from the first receiver;
   demodulating the data received at the second receiver to produce second symbol error vectors, each second symbol error vector representing a difference between the predefined point on the constellation diagram and a second measured point on the constellation diagram generated based on at least part of the data received by the second receiver; and
   determining the error vector magnitude for the data based on the first symbol error vectors and the second symbol error vectors.

2. The method of claim 1, wherein the data comprises a modulated signal; and
   wherein determining the error vector magnitude for the data comprises cross-correlating the first symbol error vectors and the second symbol error vectors, the cross-correlating removing at least some error contributions to the data produced by at least one of the first receiver or the second receiver.

3. The method of claim 2, wherein the at least some error contributions comprise uncorrelated noise, at least part of the uncorrelated noise resulting from one or more components of the ATE that are not common to both the first receiver and the second receiver.

4. The method of claim 2, wherein cross-correlating the first symbol error vectors and the second symbol error vectors comprises, for each first symbol error vector and second symbol error vector pair, multiplying one vector of the first symbol error vectors by a conjugate vector of a corresponding second symbol error vector.

5. The method of claim 1, wherein determining the error vector magnitude for the data comprises performing operations comprising:
   (a) for a point on the constellation diagram that corresponds to a symbol, cross-correlating a first symbol error vector among the first symbol error vectors and a second symbol error vector among the second symbol error vectors to produce a result;
   (b) adding a result of the cross-correlating to an aggregate;
   (c) repeating operations (a) and (b) for multiple bursts of the data thereby increasing the aggregate following each of the multiple bursts;
   (d) dividing the aggregate by a number of the multiple bursts to produce an average for the point on the constellation diagram;
   (e) determining a square root of the average to obtain a component error vector magnitude for the point on the constellation diagram; and
   (f) determining a root-mean-square of the component error vector magnitude and of other component error vector magnitudes for other points on the constellation diagram to obtain the error vector magnitude for the data.

6. The method of claim 5, wherein the first symbol error vector comprises a symbol error vector generated for the point based on a first burst of the data, and the second symbol error vector comprises a symbol error vector generated for the point based on the first burst of the data.

7. The method of claim 5, wherein one or more processing devices comprise a digital signal processor; and
   wherein different cross-correlation operations are performed contemporaneously on different asynchronous threads executing on the digital signal processor.

8. The method of claim 5, wherein the data comprises one or more complete or partial data packets, the one or more complete or partial data packets being produced by the DUT simultaneously with triggering operation of the first receiver and the second receiver.

9. The method of claim 1, wherein the data comprises a digital modulated signal having a plurality of carrier signals, wherein an error vector magnitude is determined for each one of the plurality of carrier signals.

10. The method of claim 1, wherein the data received at the first receiver and at the second receiver is from a sub-carrier of an orthogonal frequency-division multiplexing (OFDM)-modulated data stream.

11. The method of claim 10, wherein the error vector magnitude is determined for each sub-carrier of the OFDM-modulated data stream.

12. The method of claim 1, wherein the data from the DUT is received at the first receiver and at the second receiver via a splitter that receives the data from a test channel and that sends the data to each of the first receiver and the second receiver.

13. The method of claim 1, wherein the error vector magnitude for the data is at least partially based on uncorrelated noise from at least one of components or signals of the ATE, at least one of the components or signals not being common to the first receiver and the second receiver.

14. The method of claim 1, wherein the predefined point on the constellation diagram comprises an ideal point on the constellation diagram.

15. The method of claim 1, wherein the predefined point on the constellation diagram comprises an estimated point on the constellation diagram.

16. Automatic test equipment (ATE) comprising:
a first receiver to receive data from a device under test (DUT);
a second receiver to receive the data from the DUT; and
one or more processing devices to perform operations comprising:
demodulating the data received at the first receiver to produce first symbol error vectors, each first symbol error vector representing a difference between a predefined point on a constellation diagram and a first measured point on the constellation diagram generated based on at least part of the data received by the first receiver;
demodulating the data received at the second receiver to produce second symbol error vectors, each second symbol error vector representing a difference between the predefined point on the constellation diagram and a second measured point on the constellation diagram generated based on at least part of the data received by the second receiver; and
determining an error vector magnitude for the data based on the first symbol error vectors and the second symbol error vectors.

17. The system of claim 16, wherein the data comprises a modulated signal; and
wherein determining the error vector magnitude for the data comprises cross-correlating the first symbol error vectors and the second symbol error vectors, the cross-correlating removing at least some error contributions to the data produced by at least one of the first receiver or the second receiver.

18. The system of claim 17, wherein the at least some error contributions comprise uncorrelated noise, at least part of the uncorrelated noise resulting from one or more components of the ATE that are not common to both the first receiver and the second receiver.

19. The system of claim 17, wherein cross-correlating the first symbol error vectors and the second symbol error vectors comprises, for each first symbol error vector and second symbol error vector pair, multiplying one vector of the first symbol error vectors by a conjugate vector of a corresponding second symbol error vector.

20. The system of claim 16, wherein determining the error vector magnitude for the data comprises performing operations comprising:
(a) for a point on the constellation diagram that corresponds to a symbol, cross-correlating a first symbol error vector among the first symbol error vectors and a second symbol error vector among the second symbol error vectors to produce a result;
(b) adding a result of the cross-correlating to an aggregate;
(c) repeating operations (a) and (b) for multiple bursts of the data thereby increasing the aggregate following each of the multiple bursts;
(d) dividing the aggregate by a number of the multiple bursts to produce an average for the point on the constellation diagram;
(e) determining a square root of the average to obtain a component error vector magnitude for the point on the constellation diagram; and
(f) determining a root-mean-square of the component error vector magnitude and of other component error vector magnitudes for other points on the constellation diagram to obtain the error vector magnitude for the data.

21. The system of claim 20, wherein the first symbol error vector comprises a symbol error vector generated for the point based on a first burst of the data, and the second symbol error vector comprises a symbol error vector generated for the point based on the first burst of the data.

22. The system of claim 20, wherein the one or more processing devices comprise a digital signal processor; and
wherein different cross-correlation operations are performed contemporaneously on different asynchronous threads executing on the digital signal processor.

23. The system of claim 16, wherein the data comprises one or more complete or partial data packets, the one or more complete or partial data packets being produced by the DUT simultaneously with triggering operation of the first receiver and the second receiver.

24. The system of claim 16, wherein the data comprises a digital modulated signal having a plurality of carrier signals, wherein an error vector magnitude is determined for each one of the plurality of carrier signals.

25. The system of claim 16, wherein the data received at the first receiver and at the second receiver is from a sub-carrier of an orthogonal frequency-division multiplexing (OFDM)-modulated data stream.

26. The system of claim 25, wherein the error vector magnitude is determined for each sub-carrier of the OFDM-modulated data stream.

27. The system of claim 16, wherein the data from the DUT is received at the first receiver and at the second receiver via a splitter that receives the data from a test channel and that sends the data to each of the first receiver and the second receiver.

28. The system of claim 16, wherein the error vector magnitude for the data is at least partially based on uncorrelated noise from at least one of components or signals of the ATE, at least one of the components or signals not being common to the first receiver and the second receiver.

29. The system of claim 16, wherein the predefined point on the constellation diagram comprises an ideal point on the constellation diagram.

30. The system of claim 16, wherein the predefined point on the constellation diagram comprises an estimated point on the constellation diagram.

31. One or more non-transitory machine-readable storage media storing instructions that are executable by one or more processing devices to perform operations comprising:
- demodulating data received from a device under test (DUT) at a first receiver of automatic test equipment (ATE) to produce first symbol error vectors, each first symbol error vector representing a difference between a predefined point on a constellation diagram and a first measured point on the constellation diagram generated based on at least part of the data received by the first receiver;
- demodulating the data received from the DUT at a second receiver of the ATE to produce second symbol error vectors, each second symbol error vector representing a difference between the predefined point on the constellation diagram and a second measured point on the constellation diagram generated based on at least part of the data received by the second receiver; and
- determining an error vector magnitude for the data based on the first symbol error vectors and the second symbol error vectors.

* * * * *